United States Patent [19]
Albus et al.

[11] Patent Number: 5,778,791
[45] Date of Patent: Jul. 14, 1998

[54] PRINTING INSTALLATION

[75] Inventors: Marc Albus, Heretsried; Reinhard Messthaler, Mammendorf, both of Germany

[73] Assignee: MAN Roland Druckmaschinen AG, Offenbach am Main, Germany

[21] Appl. No.: 602,905

[22] Filed: Feb. 16, 1996

[30] Foreign Application Priority Data

Feb. 20, 1995 [DE] Germany ............ 195 05 692.2

[51] Int. Cl.$^6$ .................................................. B41F 33/00
[52] U.S. Cl. .................... 101/483; 101/484; 101/DIG. 47
[58] Field of Search ......................... 248/15; 101/483, 101/484, DIG. 47

[56] References Cited

U.S. PATENT DOCUMENTS

| 5,182,803 | 1/1993 | Rodi et al. ............ 395/575 |
| 5,241,483 | 8/1993 | Porret et al. ........... 364/469 |
| 5,337,044 | 8/1994 | Folger et al. . | |
| 5,412,779 | 5/1995 | Motoyama . | |
| 5,467,436 | 11/1995 | Rodi et al. ............ 395/114 |
| 5,524,805 | 6/1996 | Shiba et al. ............ 101/425 |
| 5,577,445 | 11/1996 | Haller .................. 101/424.1 |
| 5,585,839 | 12/1996 | Ishida et al. ........... 248/15 |

FOREIGN PATENT DOCUMENTS

| 0096238 | 2/1983 | European Pat. Off. . |
| 0304569 | 3/1989 | European Pat. Off. . |
| 0510519 | 10/1992 | European Pat. Off. . |
| 0617350 | 9/1994 | European Pat. Off. . |
| 0639456 | 2/1995 | European Pat. Off. . |
| 0663623 | 7/1995 | European Pat. Off. . |
| 3914238 | 10/1990 | Germany . |
| 4122421 | 2/1992 | Germany . |
| 4110649 | 10/1992 | Germany . |

OTHER PUBLICATIONS

"Vision by Telephone", Wright; Computer Systems Jan. 1986; pp. 55–58.

"Alarm übers Telefon", Electrotechnik, 70 H. 5, Mar. 31, 1988, pp. 74,76,79.

"Pour la télé—surveillance: utilisez les PTT"; J.P. Vernay; Mesures. Régulation Automatisme Controle, No. 3, Mar. 1986, pp. 70–72.

"Former aujourd'hui les rotativistes sur un simulatuer, La rotative simulé"; Caractere No. 302, Feb. 26, 1991, pp. 48–50.

"Rotationsleitstände werden immer komplexere Steuerungs-und Automatisierungs-Systeme"; H. Susenbeth; Deutscher Drucker, No. 30, Sept. 27, 1990, pp. 5, 9, 12, 15.

"L'architecture d'une rotative au 21$^e$ siècle, L'informatisation de la presse"; D. Flament; Caractere, No. 300, Jan. 29, 1991, pp. 30–33.

Wirtschafts Woche, No. 38 (Sep. 17, 1993), pp. 84 and 86 "Kabel Statt Strasse" Ruth Henke.

*Primary Examiner*—John S. Hilten
*Attorney, Agent, or Firm*—Cohen, Pontani, Lieberman, Pavane

[57] ABSTRACT

A printing machine having a plurality of printing mechanisms, a folding apparatus, and a control station with a video and audio communications system which provides for an exchange of data at any time between a printing plant in which the printing machine is installed and a remote diagnostic and maintenance station for purposes of maintenance, diagnosis and repair of the printing machine.

19 Claims, 3 Drawing Sheets 5,778,791

1

PRINTING INSTALLATION

BACKGROUND OF THE INVENTION

1. Field of the Invention

The invention is directed to a printing installation including a printing machine having a plurality of constructional units, in particular to a web-fed rotary printing machine with at least one printing mechanism and a folding apparatus which is connected with a remote diagnostic and maintenance station in which a monitor is installed. The printing machine and the remote diagnostic and maintenance station being connected via data connections.

2. Description of the Prior Art

It is already known from the periodical "Wirtschafts Woche", No. 38, (Sep. 17, 1993), pages 84 and 86, to carry out on-line maintenance of a printing machine between a printing plant and a printing machine manufacturer. The printing machine manufacturer has a remote diagnostic and maintenance station in which a monitor is installed. In the printing plant, images of the printing machine are taken by a television camera and transmitted to the remote diagnostic and maintenance station of the printer manufacturer, where the images of the printing machine shown on the monitor can be evaluated by a technician. The technician can thus make suggestions over a telephone connection for repairing the printing machine in the printing plant. It is even possible to act on the control of the printing machine via an online connection.

This reference, however, does not provide the technical means for the connection between the printing machine and the remote diagnostic and maintenance station or the technical apparatus with which the printing machine is outfitted for producing such a data connection.

SUMMARY OF THE INVENTION

Accordingly, it is an object of the present invention to provide a printing installation which has the necessary construction to carry out the remote diagnostic and maintenance operations. Pursuant to this object, and others which will become apparent hereafter, one aspect of the present invention resides in a printing installation comprised of a printing machine having a control panel and a plurality of constructional units, in particular a web fed rotary printing machine with at least one printing mechanism and a folding apparatus. A remote diagnostic and maintenance station, which includes a monitor is connected to the printing machine by data connections. A video and audio communication system that is provided at the control panel of the printing machine is connected with the individual control units of the printing machine. A computer of the video and audio communication system processes the video and audio data received from the printing machine for transmission via the data connections to the remote diagnostic and maintenance station. This data is then displayed on the monitor of the remote diagnostic and maintenance station.

A particular advantage of the present invention is in that the printing machine is outfitted with various means for receiving data. For example, optical receiving means such as endoscopes, video cameras, CCD displays or vidicons can be installed in the printing machine. Microphones, for instance, may be used as acoustic receiving means. The received data are transmitted from the receiving means to the video and/or audio communications system via permanently installed electrical lines, light guides, movable lines or via radio connections. This data is processed in the video

2 and/or audio communications system by a computer and prepared for data transmission to the remote diagnostic and maintenance station.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

DETAILED DESCRIPTION OF THE PREFERRED EMBODIMENTS

Figure 1:
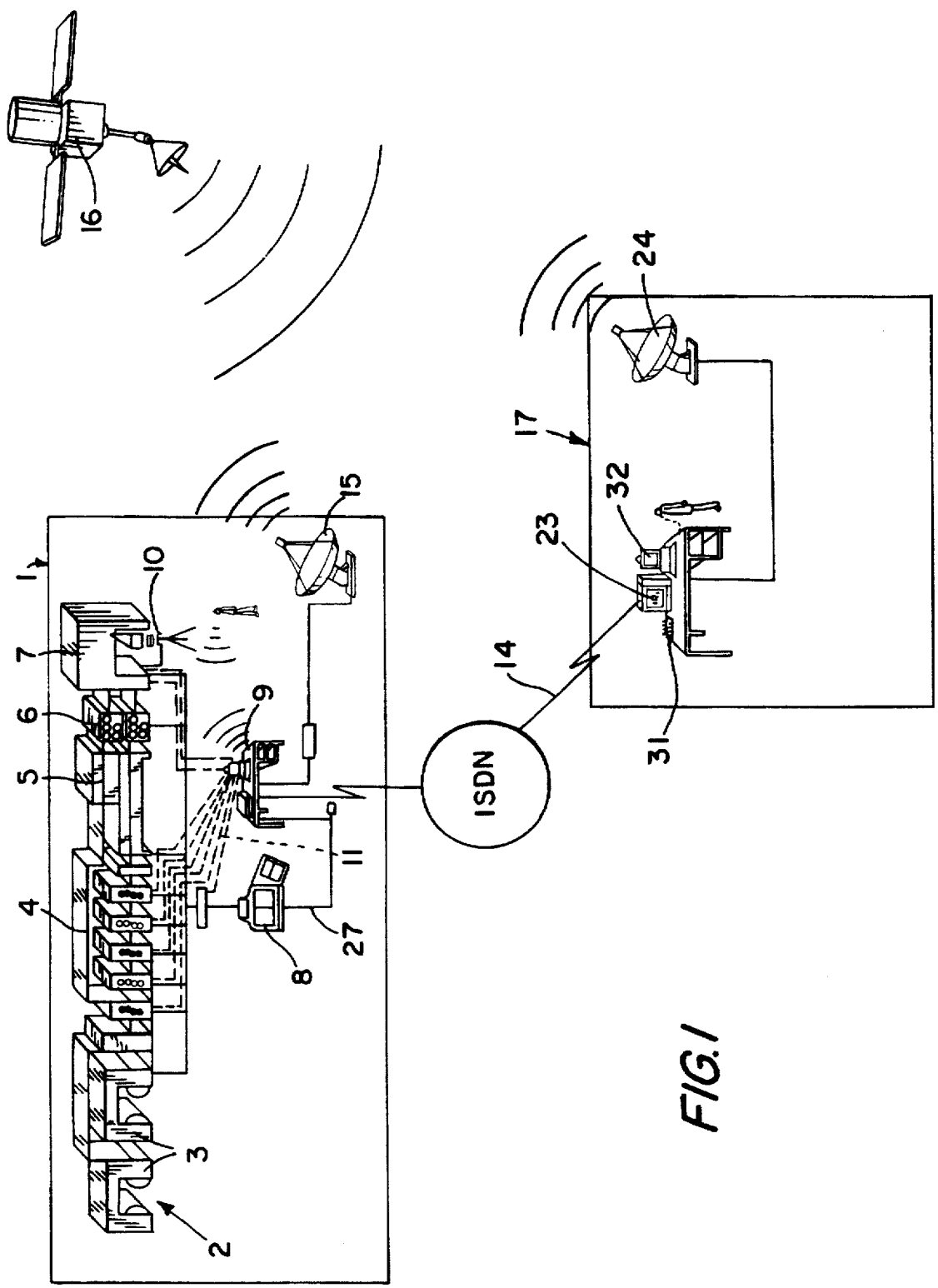
FIG. 1 shows a web-fed rotary printing machine in a printing installation which is connected with a remote diagnostic and maintenance station, pursuant to the present invention.

As can be seen in FIG. 1, a printing machine, e.g., a web-fed rotary printing machine 2, is installed in a printing plant 1. The web-fed rotary printing machine 2 has two reel changers 3, a plurality of printing mechanisms 4, a drier 5, a cooling apparatus 6, and a folding apparatus 7. These component parts 3-7 of the web-fed rotary printing machine 2 are connected via electrical lines with a control station 8. In addition, lines for electrical or optical data transmission, i.e., electric cables or light guides, are integrated in the component parts 3-7. For example, the lines are integrated in separate cable ducts inside side walls together with the rest of the supply lines for the web-fed rotary printing machine 2. Connection strips to which the connectors of optical, electrical or acoustic receiving means can be connected are provided on the outside of the side walls. The receiving means are, e.g., video cameras, video recorders, vidicons, CCD displays, photocells, photodiodes, optical sensors, acoustic sensors such as microphones, or electrical detectors, which receive optical, acoustical or electrical signals within the printing machine and transmit these signals, via the connectors and lines, to a video and audio communications system 9 which is arranged in or in the vicinity of the control board of the printing machine making up part of the control station 8. The receiving means are either integrated in a stationary manner in the web-fed rotary printing machine 2 so as to carry out immediate measurements at the "neural" points or are installed individually by operators as in the case of the video camera 10 shown on a tripod in FIG. 1. Since the various receiving means mentioned above are known in the art both as to construction and operation, an illustration of each listed receiving means has not been provided and is not believed necessary for a complete understanding of how to make and use the invention.

Not only are the data transported via a data output by means of lines integrated in the web-fed rotary printing machine 2, but the electric power for the receiving means can also preferably be ensured via corresponding supply lines which are already present in the printing machine and via associated connectors at the side walls of the printing machine. The data received by the various receiving means in the web-fed rotary printing machine 2 are fed to the video and audio communications system via various data lines 11. This video and audio communications system either has a separate computer or uses the computer associated with the control station 8.

Figure 2:
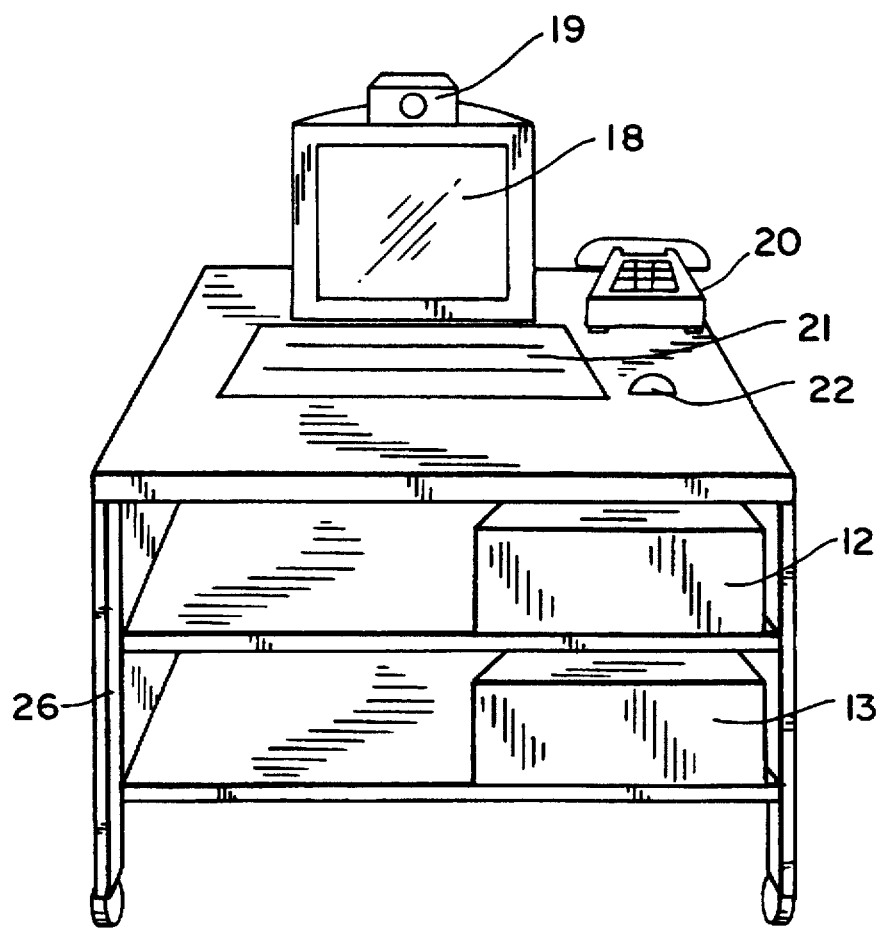
FIG. 2 shows a video and audio communications system for connecting to the printing machine.

The video and audio communications system 9 (FIG. 2), for instance, has a known industrial-use personal computer (PC) 12. This PC has a central control unit (CPU card (486/66)) and various communications adapters for communicating with the web-fed rotary printing machine 2, including a X.21 card. There are also adapters for optical and acoustical signals (VGA adapter, Screen Machine video board (two), audio processor) and an adapter for input and output data (multi I/O adapter). Further, the PC 12 is outfitted with a video switch, an encoder/decoder, and an ISDN card. The data received by the receiving means in the web-fed rotary printing machine, insofar as they are analog data, are first digitized in an A/D converter and then fed to the PC 12. The PC 12 is connected with a multiplexing/demultiplexing unit 13 via the ISDN card. The data are then transmitted from the PC 12 as digital signals by the ISDN process to a remote diagnostic and maintenance station 17 either via permanently installed optical or electrical lines 14 or from a ground transmitting station 15 via a satellite 16.

Further, the video and audio communications system 9 has a monitor 18, preferably a color monitor, a personnel camera 19, a mobile telephone 20 with headset, a keyboard 21, and a mouse 22. The operator is filmed via the personnel camera 19 and the image signals from the personnel camera 19 are preferably displayed in a section of a monitor 23 in the remote diagnostic and maintenance station 17. The station 17 is connected with a ground reception station 24 if the data are transmitted via the satellite 16. After being processed by the PC 12 in the printing plant 1, the data originating from the various component parts 3–7 of the web-fed rotary printing machine 2 can now be displayed over the monitor 23 via the lines 14 or via the satellite 16 and evaluated by the maintenance staff in the remote diagnostic and maintenance station 17. A PC 32 is preferably used in the remote diagnostic and maintenance station 17 for evaluating data. This PC 32 is preferably outfitted with the same component parts as the PC 12. Files containing data on the printing machine, in particular graphic sectional views of component parts of the printing machine, files on production data for the printing machine, and the like are available in the remote diagnostic and maintenance station 17 and can be retrieved by the operating staff by means of the PC 32. The maintenance and operating staff in the printing plant 1 communicate with the personnel in the remote diagnostic and maintenance station 17 concerning disturbances and errors in the web-fed rotary printing machine 2 by telephone, preferably via picture telephone. Data are also transmitted and received between the web-fed rotary printing machine 2 and the remote diagnostic and maintenance station 17 via the data lines 14 or the satellite 16.

The video and audio communications system 9 is preferably installed on a movable console 26. In this way, the operating staff can move the video and audio communications system 9 to various locations of the web-fed rotary printing machine 2 from which they can, establish a connection with the remote diagnostic and maintenance station 17. The video and audio communications system 9 can also use the existing computer in the control station 8 instead of the PC 12 shown in FIG. 2. It is connected with the control station via a data line 27.

Figure 3:
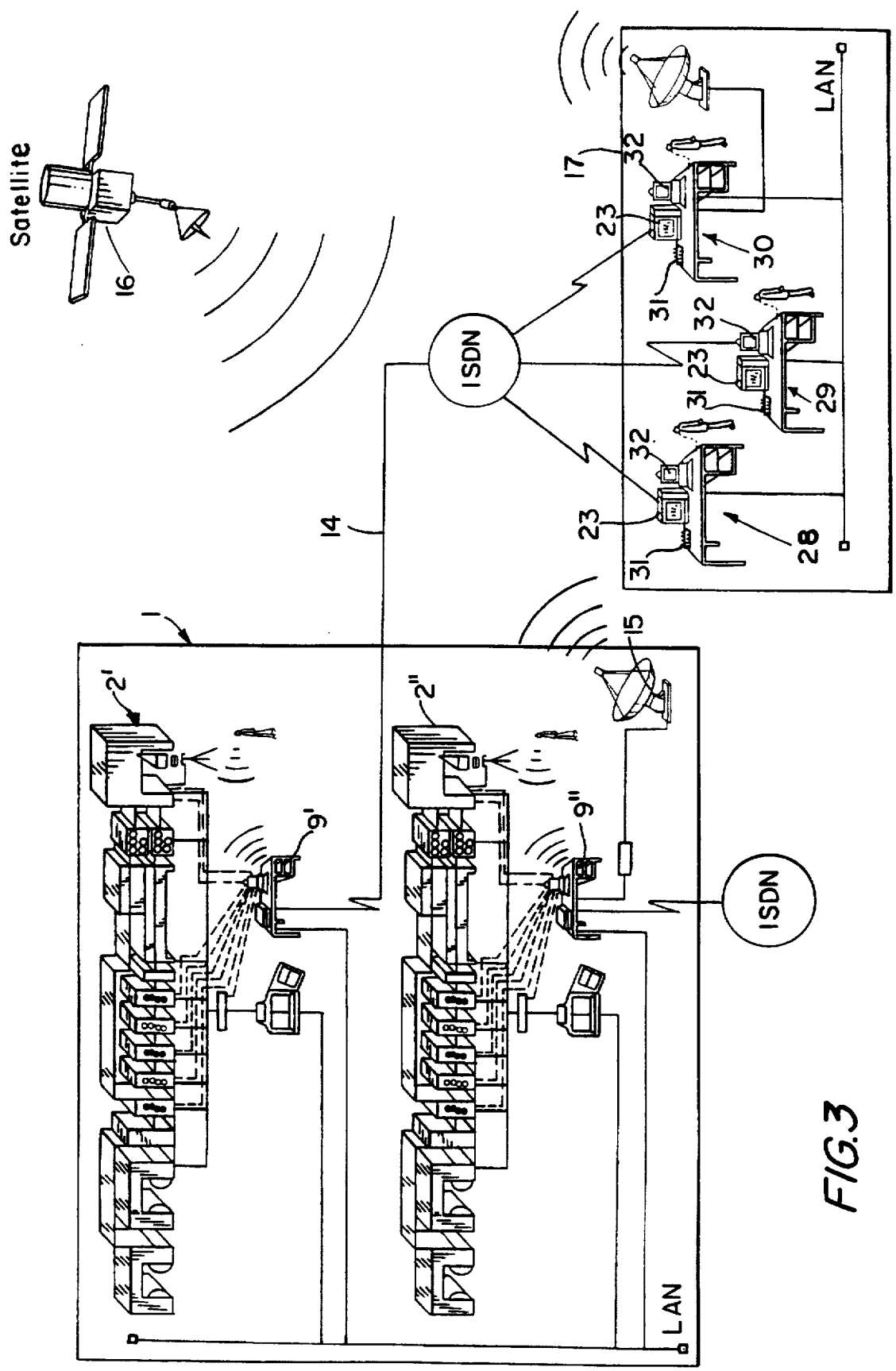
FIG. 3 shows a plurality of web-fed rotary printing machines in a printing plant which are connected with a plurality of remote diagnostic and maintenance stations.

In another embodiment of the invention illustrated in FIG. 3, there are two web-fed rotary printing machines 2', 2" in a printing plant 1 similar to FIG. 1, which are respectively connected to a video and audio communications system 9', 9". These web-fed rotary printing machines 2', 2" are connected with one another via a local data network (LAN). The digitized data are transmitted from the individual ground transmission station 15 or via optical or electrical lines 14 by the ISDN process either to an individual remote diagnostic and maintenance station 17 with a plurality of work stations 28–30 for maintenance engineers, the latter likewise being interconnected via a local data network (LAN), or to a plurality of remote diagnostic and maintenance stations (not shown in the drawing).

The interchange illustrated in FIG. 3 between the printing plant 1 and the remote diagnostic and maintenance station 17 affords an optimum connection for the maintenance of the installed web-fed rotary printing machines 2', 2", wherein files may be transferred and terminal emulation and video conferences can be carried out. Video and sound can also be transmitted for training purposes. The web-fed rotary printing machines 2', 2" can be transmitted by data transmission, picture transmission and sound transmission bidirectionally from the machine room of the printing plant 1 to a service technician or to a number of services technicians, e.g., with expertise in different areas of the web-fed rotary printing machines 2', 2". The service technicians at the remote diagnostic and maintenance station 17 can remotely control the web-fed rotary printing machines 2', 2" via either the satellite 16 or the data line 14. In other words, the service technicians can monitor software and files, start and use software in the printing plant 1, isolate and eliminate errors in the web-fed rotary printing machines 2', 2" or instruct the operating staff from a remote location to carry out operations on the machines, and at the same time the operating staff can be observed and coached via transmission by the personnel camera 19.

In a particularly advantageous manner, endoscopes are also used for receiving optical data inside the web-fed rotary printing machine 2, 2' or 2". These endoscopes are beneficial in that they can be arranged at locations which would otherwise be inaccessible to the operating staff in order to detect errors. It is also possible, for example, to receive sound waves, e.g., structure-borne sound, with acoustic receivers and to transmit such sound waves to the remote diagnostic and maintenance station 17 as digitized data so that the service staff at the station 17 can carry out a comparison with acoustic data, so-called sonagrams, which are already stored in files so that defects within the printing machine, e.g., a defective ball bearing, can be determined from this data.

In a further embodiment of the invention, it is also possible to control a robot from the remote diagnostic and maintenance station 17, which robot is provided in the printing plant 1 and is outfitted with a transmitter and a receiver and is monitored by the personnel camera 19. In every case, the transmitter and receiver of the robot exchange data with the remote diagnostic and maintenance station 17 either via the video and audio communications system 9, 9' or 9" or directly with the remote diagnostic and maintenance station 17.

The video and audio communications system 9, 9' or 9" can also be used to diagnose errors in a folding unit. For example, the folded product may have corners, be folded on a diagonal or have punctures. The movement of the cut register marks or the shingling spacing can be observed via camera, e.g., by means of video camera or endoscope.

Defects can also occur during reformatting. Data from the folding panel, e.g., warning messages, can be fed to the video and audio communications system 9, 9' or 9" by the folding apparatus computer and accordingly via the control station 8 simultaneously with data obtained from the receiving means via line 11 and can be evaluated in the remote diagnostic and maintenance station 17. Static images of damage to radial cams, running rollers, cutter bars, groove bars, folding jaws, and brushes for the first transverse fold of the braking brushes for the third fold can be filmed or photographed and fed to the remote diagnostic and maintenance station 17 via the video and audio communications system 9, 9', or 9". Data can then be transmitted from the latter to the printing plant 1 via the optical or electrical lines 14 or via station 24, satellite 16, and station 15. Replacement parts for the web-fed rotary printing machine 2, 2' or 2" can also be identified by the service staff in the remote diagnostic and maintenance station 17 with the aid of pictures.

The component parts 3–7 of the web-fed rotary printing machine 2, 2' or 2" can also be taped with a video recorder. The remote diagnostic and maintenance station 17 is preferably provided with a video cassette recorder 31 in which video cassettes containing information on the web-fed rotary printing machine 2, 2' or 2" can be played back and transmitted to the printing plant 1 via the PC 32 and the lines 14 or the satellite 16.

The invention is not limited by the embodiments described above which are presented as examples only but can be modified in various ways within the scope of protection defined by the appended patent claims.

I claim:

1. A printing installation, comprising:
   a printing machine including a control panel and a plurality of constructional units;
   a remote diagnostic and maintenance station including a monitor; data connection means for connecting together the printing machine and the remote diagnostic and maintenance station for data transmission; and
   a video and audio communication system connected to individual ones of the constructional units of the printing machine, the video and audio communications system including a computer operatively connected to the data connection means and being operative to process video and audio data received from the printing machine for transmission by the data connection means, the monitor of the remote diagnostic and maintenance station being operative to display and reproduce the video and audio data, the remote diagnostic and maintenance station further being operative to send operating instructions to the printing machine via the data connection means, based upon the video and audio data.

2. A printing installation according to claim 1, wherein the video and audio communication system is integrated in the control panel of the printing machine.

3. A printing installation according to claim 1, wherein the printing machine is a web-fed rotary printing machine, and the plurality of constructional units include at least one printing mechanism and a folding apparatus, the video and audio communication system being in operative connection with the at least one printing mechanism and the folding apparatus.

4. A printing installation according to claim 1, and further comprising receiving means for receiving data from the printing machine and passing it to the video and audio communication system.

5. A printing installation according to claim 4, wherein the receiving means is operative to receive electrical data.

6. A printing installation according to claim 4, wherein the receiving means includes a video camera.

7. A printing installation according to claim 4, wherein the receiving means includes an endoscope.

8. A printing installation according to claim 4, wherein the receiving means includes a vidicon.

9. A printing installation according to claim 4, wherein the receiving means includes photodiodes.

10. A printing installation according to claim 4, wherein the receiving means includes acoustical receivers.

11. A printing installation according to claim 10, wherein the acoustical receivers are microphones.

12. A printing installation according to claim 4, wherein the receiving means includes a video recorder.

13. A printing installation according to claim 4, and further comprising data transmission lines connected between the receiving means and the video and audio communication system to transmit data received by the receiving means to the video and audio communication system.

14. A printing installation according to claim 13, wherein the data transmission lines are electrical lines.

15. A data installation according to claim 13, wherein the data transmission lines are optical lines.

16. A printing installation according to claim 1, wherein the video and audio communication system includes a multiplexing/demultiplexing unit connected to the computer for bidirectional data transmission between the printing machine and the remote diagnostic and maintenance station.

17. A printing installation according to claim 1, wherein the data connecting means includes optical lines connected between the printing machine and the remote diagnostic and maintenance station.

18. A printing installation according to claim 1, wherein the data connecting means includes electrical lines connected between the printing machine and the remote diagnostic and maintenance station.

19. A printing installation according to claim 1, wherein the data connecting means includes ground transmission and ground reception stations connected to the printing machine and the remote diagnostic and maintenance station, and a satellite arranged to transmit signals between the ground transmission and reception stations.

* * * * *